United States Patent
Adamczyk et al.

(10) Patent No.: US 7,995,714 B2
(45) Date of Patent: Aug. 9, 2011

(54) VOICEMAIL CONVERSION

(75) Inventors: Maria Adamczyk, Alpharetta, GA (US); Anita Hogans Simpson, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1201 days.

(21) Appl. No.: 11/673,413

(22) Filed: Feb. 9, 2007

(65) Prior Publication Data

US 2008/0192902 A1 Aug. 14, 2008

(51) Int. Cl.
*H04M 1/64* (2006.01)

(52) U.S. Cl. .................. 379/88.12; 379/88.11; 455/413

(58) Field of Classification Search .... 379/88.22–88.28; 455/412.1–413
See application file for complete search history.

(56) References Cited

U.S. PATENT DOCUMENTS

| | | | | |
|---|---|---|---|---|
| 5,799,060 A * | 8/1998 | Kennedy et al. | ........... | 379/29.05 |
| 6,888,823 B1 * | 5/2005 | Zaffino | ......................... | 370/354 |
| 2007/0070976 A1 * | 3/2007 | Mussman et al. | ............. | 370/351 |
| 2007/0087730 A1 * | 4/2007 | Diroo et al. | ................... | 455/413 |
| 2008/0056473 A1 * | 3/2008 | Kent et al. | ................ | 379/201.01 |

* cited by examiner

*Primary Examiner* — Simon Sing
*Assistant Examiner* — Assad Mohammed
(74) *Attorney, Agent, or Firm* — Thomas, Kayden, Horstemeyer & Risley, LLP

(57) ABSTRACT

Included are embodiments of methods for providing voicemail conversion. At least one embodiment of a method includes receiving a message waiting indicator signal in a first protocol, the message waiting indicator signal being received from a Public Switched Telephone Network (PSTN) based voicemail server, the message waiting indicator signal being configured to indicate that a message for a called party has been received by the PSTN based voicemail server. Some embodiment of a method include receiving a PSTN based identifier for an Internet Protocol (IP) based communications device associated with the called party and converting the received message waiting indicator signal from the first protocol to a second protocol, the second protocol being configured for communication to the IP based communications device.

19 Claims, 17 Drawing Sheets

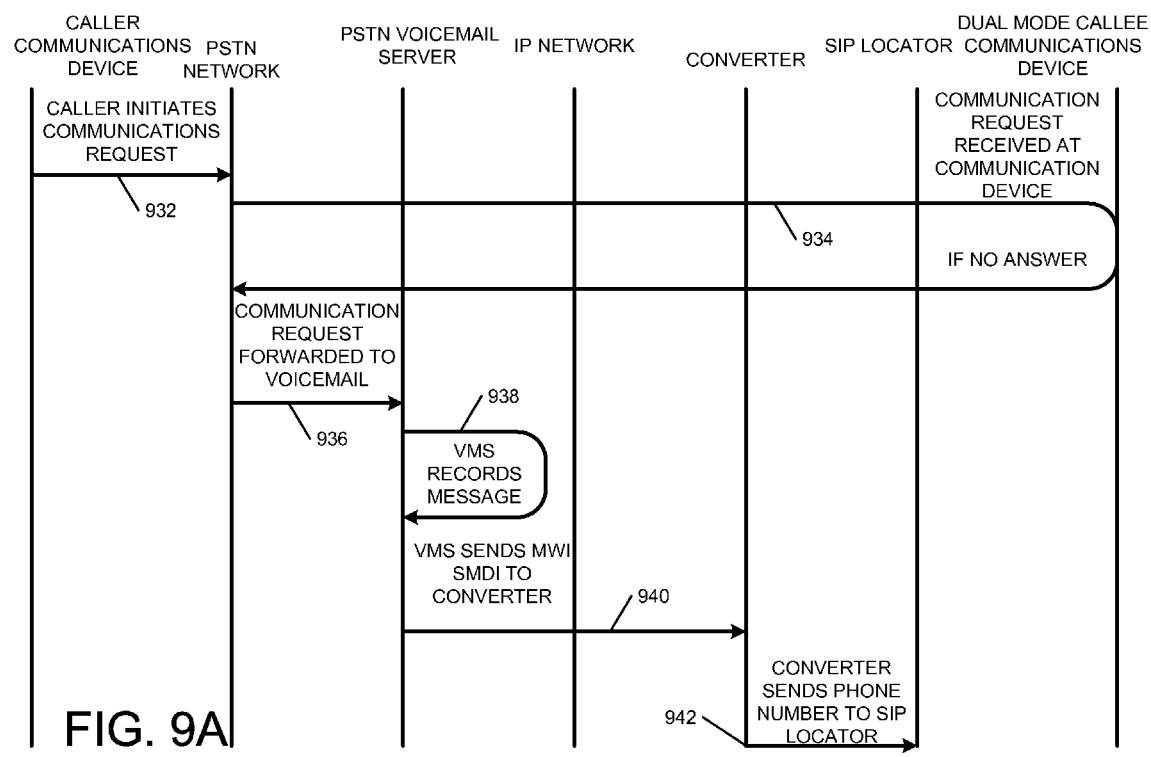

VOICEMAIL CONVERSION

BACKGROUND

Voicemail servers have been implemented in communications systems to provide users with the ability to record messages directed to them when unavailable at a communications device. Generally speaking, when a caller sends a communication request to a communications line associated with a user, a communication network determines whether the user is available on the communications line. If the user is not available on the communications line, the communication request may be forwarded to a voicemail server that is coupled to the communications network. The voicemail server can then provide a predetermined recording to the caller and prompt the caller to leave a message.

While many users utilize the voicemail servers in Public Switched Telephone Networks ("PSTNs"), many users have migrated to Internet Protocol ("IP") networks and are thus utilizing IP voicemail servers. This transgression has provided users with increased functionality and speed for their communication and voicemail services. While many users have changed from PSTN voicemail services to IP voicemail services, some users, although utilizing an IP communications network (such as Voice over IP networks), prefer to maintain their PSTN voicemail services. As such, integration among IP networks and wireless networks with PSTN voicemail servers have become problematic. Many users utilize PSTN voicemail servers that are unable to send Message Waiting Indicator ("MWI") signals to IP based communications devices.

Thus, a heretofore unaddressed need exists in the industry to address the aforementioned deficiencies and inadequacies.

SUMMARY

Included are embodiments for providing voicemail conversion. At least one embodiment of a method includes receiving a message waiting indicator signal in a first protocol, the message waiting indicator signal being received from a Public Switched Telephone Network (PSTN) based voicemail server, the message waiting indicator signal being configured to indicate that a message for a called party has been received by the PSTN based voicemail server. Some embodiments of a method include receiving a PSTN based identifier for an Internet Protocol (IP) based communications device associated with the called party and converting the received message waiting indicator signal from the first protocol to a second protocol, the second protocol being configured for communication to the IP based communications device.

Also included are embodiments of a system for providing voicemail conversion. At least one embodiment of a system includes an indicator receiving component configured to receive a message waiting indicator signal in a first protocol, the message waiting indicator signal being received from a Public Switched Telephone Network (PSTN) based voicemail server, the message waiting indicator signal being configured to indicate that a message for a called party has been received by the PSTN based voicemail server. Some embodiments include an identifier receiving component configured to receive a PSTN based identifier for an Internet Protocol (IP) based communications device associated with the called party and a converting component configured to convert the received message waiting indicator signal from the first protocol to a second protocol, the second protocol being configured for communication to the IP based communications device.

Also included are embodiments of a computer readable medium for providing voicemail conversion. At least one embodiment of a computer readable medium includes indicator receiving logic configured to receive a message waiting indicator signal in a first protocol, the message waiting indicator signal being received from a Public Switched Telephone Network (PSTN) based voicemail server, the message waiting indicator signal being configured to indicate that a message for a called party has been received by the PSTN based voicemail server. Some embodiments include identifier receiving logic configured to receive a PSTN based identifier for an Internet Protocol (IP) based communications device associated with the called party and converting logic configured to convert the received message waiting indicator signal from the first protocol to a second protocol, the second protocol being configured for communication to the IP based communications device.

Other systems, methods, features, and advantages of this disclosure will be or become apparent to one with skill in the art upon examination of the following drawings and detailed description. It is intended that all such additional systems, methods, features, and advantages be included within this description, and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 9A is an exemplary embodiment of a sequence diagram for providing a message waiting indicator signal to a user of an IP based communications device via a wire and IP network, similar to the sequence diagrams from FIGS. 8A, 8B, and 8C.

DETAILED DESCRIPTION

Figure 1:
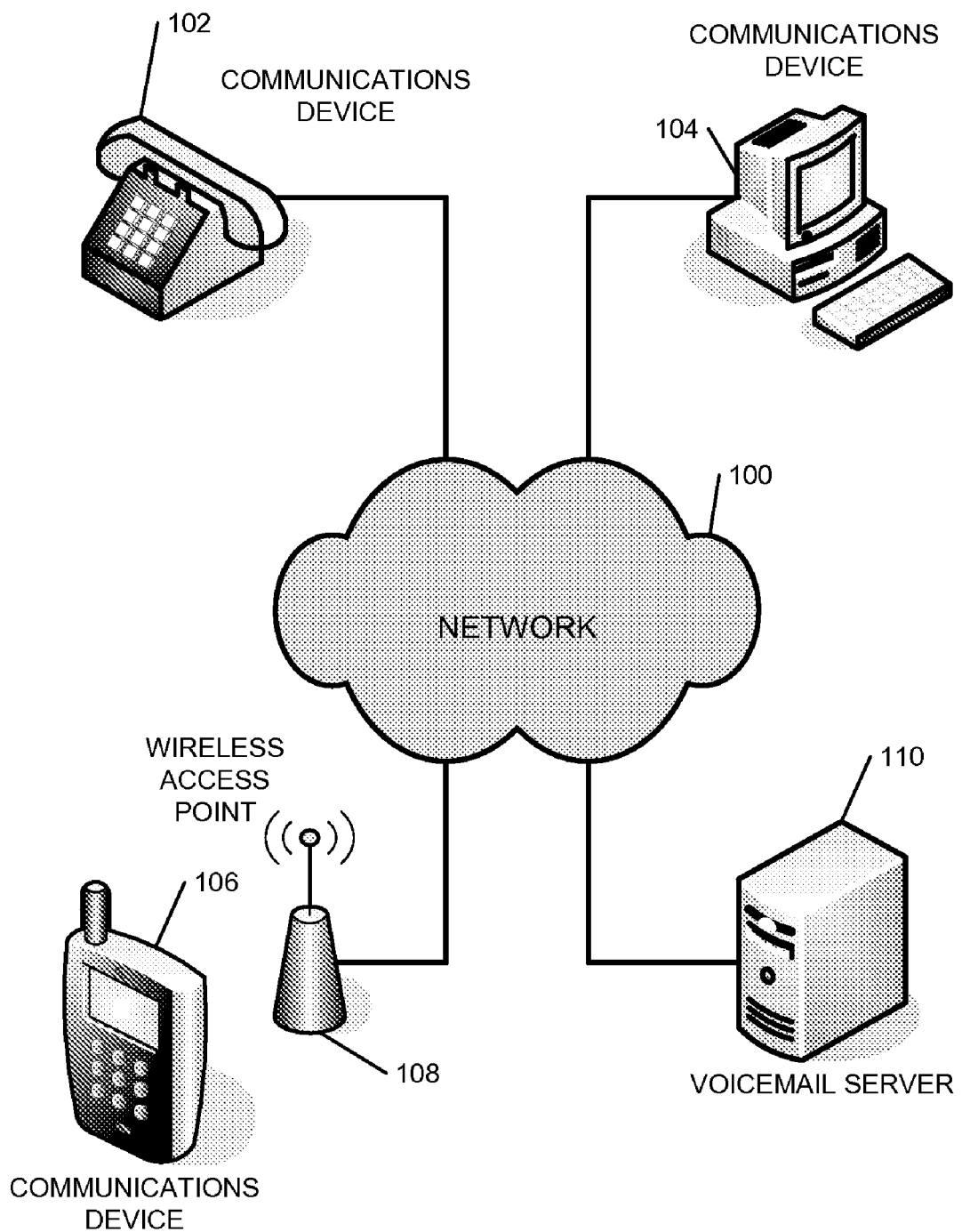
FIG. 1 is a functional diagram of an exemplary communications network environment.

FIG. 1 is a functional diagram of an exemplary communications network environment. As illustrated, a plurality of users may be connected via an external network such as a communications network 100. The communications network 100 can include, for example, the Internet, a Wi-Fi® network (IEEE 802.11 compatible), a Wi-Max network (IEEE 802.16 compatible), a Public Switched Telephone Network (PSTN), a cellular communications network and/or other communications mediums. Users may access the communications network 100 via a communications device 102, a communications device 104, and/or a communications device 106 (via a wireless access point 108).

It should be appreciated that while the network 100, the communications devices 102, 104, 106 (via the wireless access point 108), and connections illustrated in FIG. 1 are shown by way of example, this disclosure is not limited to these examples. This disclosure may be applicable to any communications device, connection, and network that supports voice, data, and/or other types of communications.

One should note that depending on the type of communication desired, different functionality may be utilized. More specifically, while the communications devices 102 and 106 may be configured to facilitate voice communications over a cellular network and/or a PSTN, these devices may also be configured for data communications via the Internet. Similarly, the communications devices 102 and 106 may also be configured to facilitate communications via a Wi-Fi® network and/or a Wi-Max network. As a nonlimiting example, if a user operating the communications device 106 wishes to make a cellular communication, the user can input the address (e.g., telephone number) of the called party device. This address can be sent to the wireless access point 108 (which may include a cellular antenna and/or other component), configured to send the communication request to the network 100. The network 100 may employ one or more cellular networks, PSTNs and/or other networks for facilitating the communication. Upon connecting communications device 104 with the called party device 102, communication may begin.

Similarly, if a user operating the communications device 104 wishes to access a website (and/or other data associated with the Internet), the user can send a communication request, which may include an address, such as a Uniform Resource Locator (URL) or other Uniform Resource Identifier (URI). The request can be sent to the desired computing device (such as a server data storage) via the network 100, which may include the Internet, a Wi-Max network a Wi-Fi® network, cellular network, and/or other network. The desired computing device can then respond by sending the requested data to the communications device 104 via the same (or similar) transmission mediums.

Also included in the nonlimiting example of FIG. 1 is a voicemail server 110. The voicemail server 110 may be configured to serve one or more user accounts. More specifically, in at least one embodiment, the voicemail server 110 may be configured to provide voicemail services for a telephone line coupled to the communications device 102. The voicemail server 110 may be configured to receive a redirected call intended for a user associated with the communications device 102. If the network 100 determines that a user is currently not available on the communications device 102, the call may be redirected to the voicemail server 110. The voicemail server 110 may be configured to provide the caller with options for leaving a message. Once a message is received (and/or stored), the voicemail server 110 can send a Message Waiting Indicator (MWI) signal to the communications device 102 (and/or one or more communications devices associated with the line to which the communications device 102 is connected). Upon receiving the message waiting indicator signal from the voicemail server 110, the communications device 102 may display a light and/or other signifier of the message waiting indicator signal.

Figure 2:
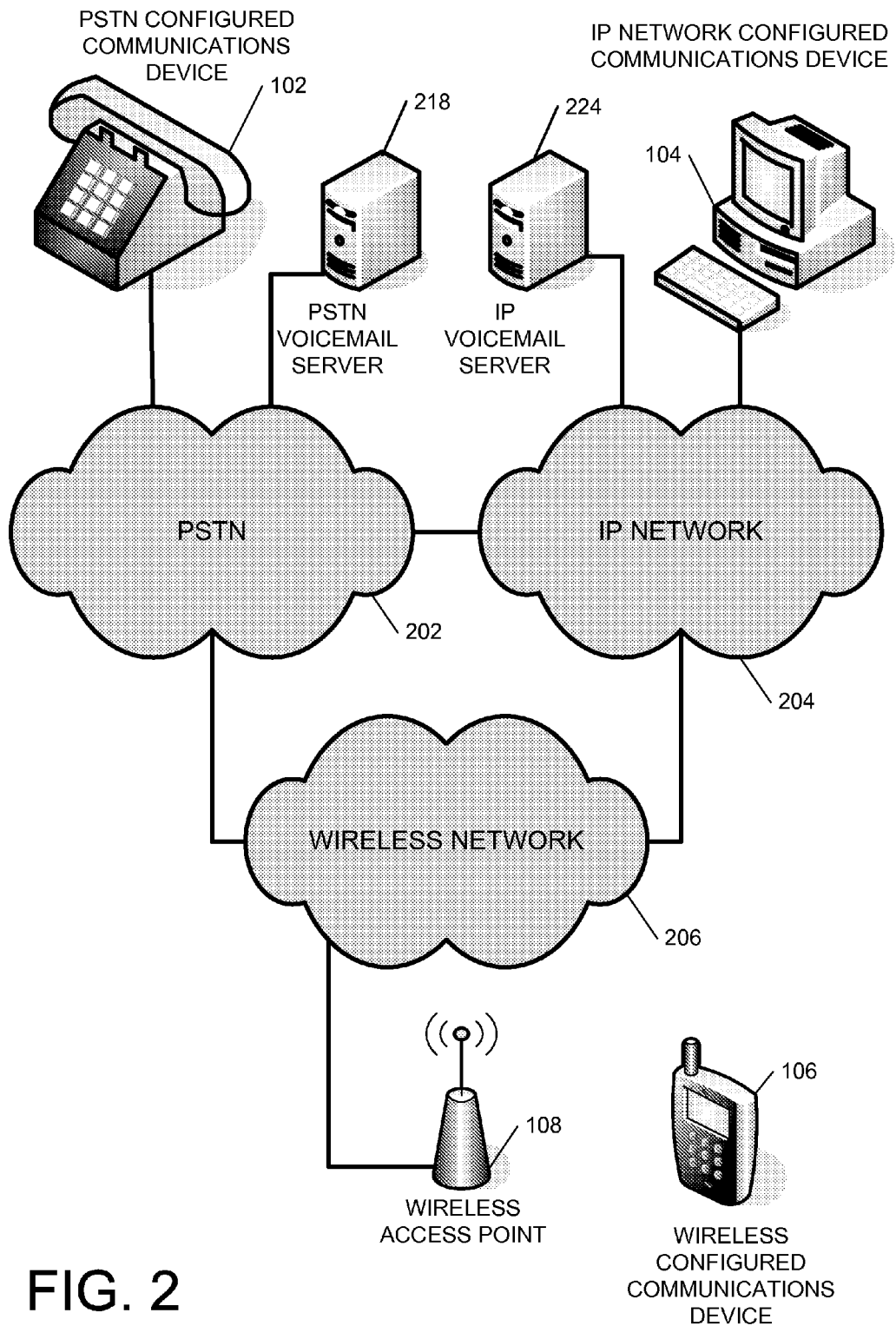
FIG. 2 is a functional diagram illustrating an embodiment of a communications network configuration, similar to the configuration from FIG. 1.

FIG. 2 is a functional diagram illustrating an embodiment of a communications network configuration, similar to the configuration from FIG. 1. As illustrated in FIG. 2, a communications network may include a plurality of networks, such as a Public Switched Telephone Network (PSTN) 202, a wireless network 206, which may include at least one wireless access point 108 (e.g., a communications tower, Wi-Fi® hot spot, etc.), and an Internet Protocol (IP) network 204 among others. The PSTN 202 may be coupled to at least one PSTN configured communications device 102. The PSTN configured communications device 102 may be a conventional telephone, a wireless telephone, a personal computer, or other device.

Similarly, the IP network 204 may be coupled to at least one IP configured communications device 104. The IP configured communications device 104 may include a personal computer, a telephone, and/or a wireless device (such as a pocket personal computer), or other device configured to communicate using an IP network. Further, a wireless configured communications device 106 may be coupled (wired or wirelessly) to the wireless access point 108, which can facilitate communications with the wireless network 206. One should note that while FIG. 2 represents the wireless access point 108 as a structural tower, this is not intended as a limitation. The wireless access point 108 may take any of a number of forms such as a satellite, cellular tower, router, and/or other facilitator of communications with the wireless network 206.

Additionally, while the wireless configured communications device 106 is illustrated as coupling wirelessly with the wireless access point 108, this is not intended as a limitation. Further, the IP network configured communications device 104 and the PSTN configured communications device 102 may also communicate wirelessly or via a wired communications medium, depending on the particular configuration. The purpose of this disclosure is not to limit the subject matter in this or other manners.

Additionally included in the nonlimiting example of FIG. 2 are a PSTN voicemail server 218 and an IP voicemail server 224. In at least one embodiment, the PSTN voicemail server 218 may be configured for providing voicemail services according to a PSTN network, such as PSTN 202. Similarly, the IP voicemail server 224 may be configured for providing voicemail services according to an IP network (such as a Voice over Internet Protocol (VoIP) network). Generally speaking, a user of the PSTN configured communications device 102 is associated with the PSTN voicemail server 218. However, as users migrate from the PSTN configured communications devices 102 to the IP network configured communications devices 104, some users may maintain an account with the PSTN based voicemail server 218. Similarly, as some users change from the IP network configured communications device 104 to the PSTN configured communications device 102, those users may maintain an account with the IP based voicemail server 224. Since the PSTN based voicemail server 218 may not be configured to communicate with the IP network configured communications device 104 (and the IP based voicemail server 224 may not be configured to communicate with the PSTN configured communications device 102), problems may arise. Similar problems may also arise with the presence of a wireless based voicemail server coupled to the wireless network 206 (not shown).

Figure 3:
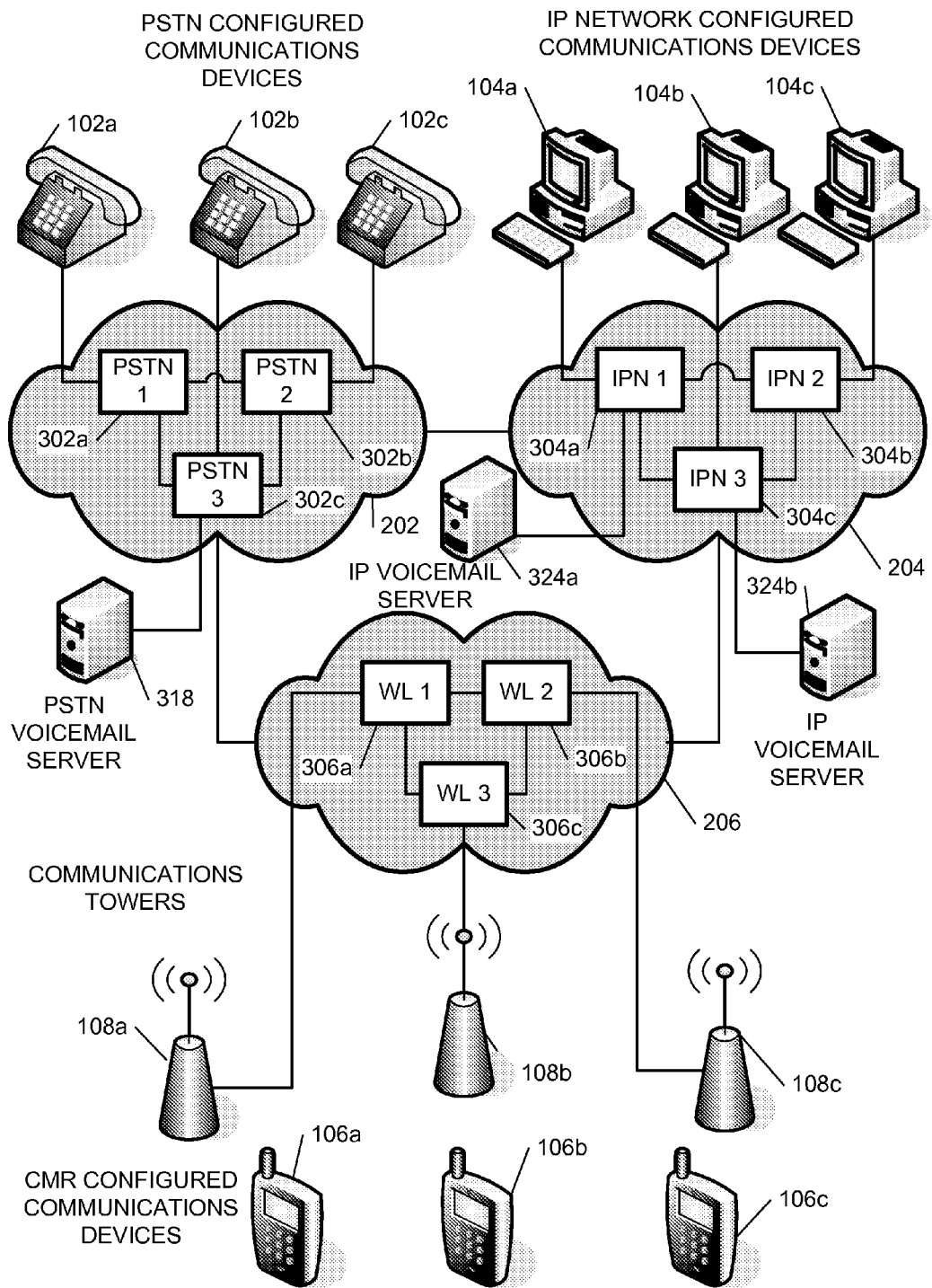
FIG. 3 is a functional diagram illustrating a detailed view of a communications network configuration, similar to the configuration from FIG. 2.

FIG. 3 is a functional diagram illustrating a detailed view of a communications network configuration, similar to the configuration from FIG. 2. As illustrated, the PSTN 202 includes a plurality of PSTN configured communications devices 102a, 102b, 102c, coupled to a PSTN sub-network 1 (PSTN1) 302a, (PSTN2) 302b, (PSTN3) 302c, respectively. In at least one embodiment, the PSTN1 302a is a PSTN of one communications protocol, while the PSTN2 302b is a PSTN of another protocol. The PSTN3 302c is a communications protocol different than both the PSTN1 302a and the PSTN2 302b.

Similarly, the IP configured communications devices 104a, 104b, 104c are coupled to an IP Sub-Network 1 (IPN1) 304a, IPN2 304b, IPN3 304c, respectively. In at least one embodiment, each of these sub-networks is configured to communicate in a protocol different than the other two. As a nonlimiting example, the IPN1 304a can be a Digital Subscriber Line (DSL) communications network, while the IPN2 304b can be a cable-based IP network. The IPN3 304c may be a communications network that conforms to another protocol, which may be different than the IPN1 304a, and/or the IPN2 304b.

The wireless network 206 may be coupled to one or more of the wireless configured communications devices 106a, 106b, and/or 106c via the wireless access points 108a, 108b, and 108c. One or more of the wireless configured communications devices 106a, 106b, 106c may be coupled to a wireless subnet (WL1) 306a, WL2 306b, WL3 306c, respectively. One or more of the wireless sub-networks 306a, 306b, 306c may be configured to communicate data pursuant to a different communications protocol. As a nonlimiting example, the WL1 306a may be configured to communicate via a Personal Communications Services (PCS), while the WL2 306b may be configured to communicate via an analog cell phone protocol, while the WL3 306c may be configured to communicate via a digital service protocol.

Although the PSTN configured communications device 102a may be a PSTN-based communications device, a user may establish a communications session with wireless configured communications device 106c, regardless of the fact that the two users are implementing devices that utilize different protocols. As with any of the devices illustrated in these nonlimiting examples, users of devices that operate via different protocols may generally establish a communications session.

Additionally included in the nonlimiting example of FIG. 3 are a PSTN voicemail server 318, an IP voicemail server 324a, and an IP voicemail server 324b. As discussed above, the PSTN voicemail server 318 may be configured to provide voicemail services in a PSTN, while the IP voicemail servers 324a, 324b may be configured to provide voicemail services in an IP network. Additionally, as discussed above, as PSTN the voicemail server 318 may have difficulty providing services to the IP network configured devices 104, the IP voicemail server 324a may have difficulty providing services to communications devices on a different sub-network (e.g., the communications device 104c on the IPN2 304b). Similar difficulties may arise with other sub-networks on the PSTN 202 and/or the wireless network 206.

One should also note that while only one communications device is coupled to each sub-network in FIG. 3, this is for discussion purposes only. As one of ordinary skill in the art will understand, any number of communications devices may be coupled to a single sub-network.

Figure 4:
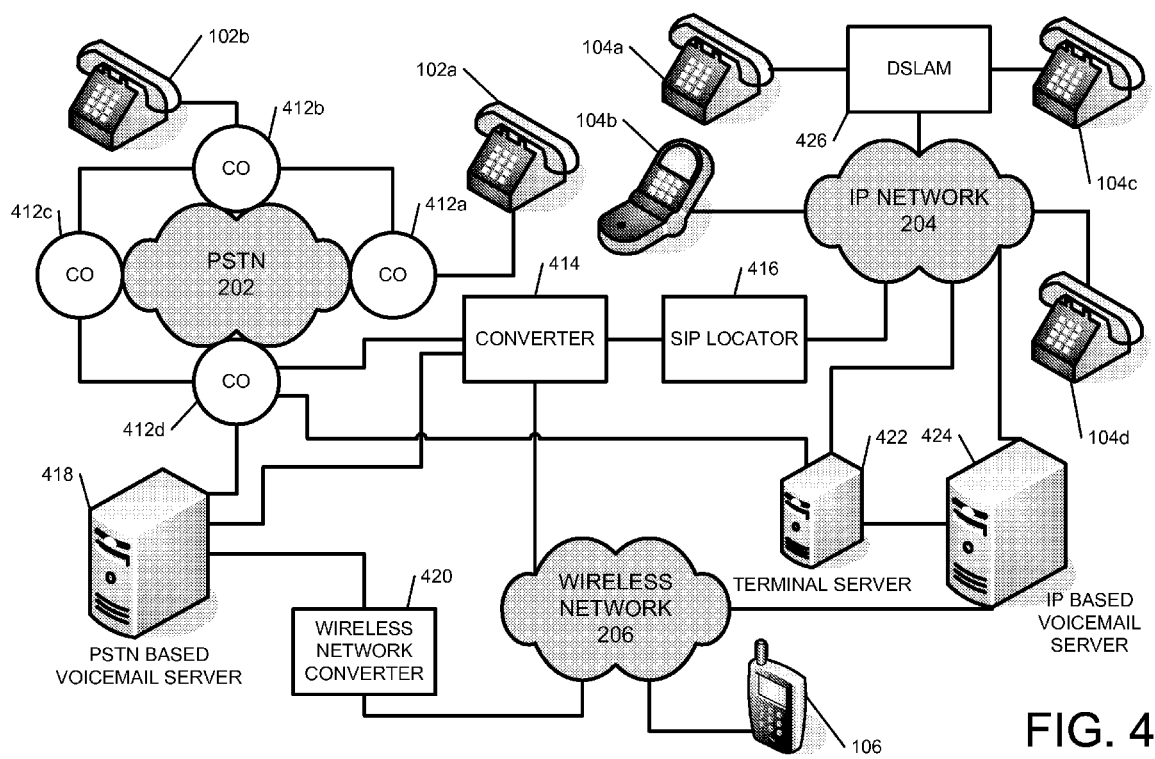
FIG. 4 is an exemplary embodiment of a communication network illustrating the facilitation of voicemail services between the PSTN network, an IP network, and a wireless network similar to the diagram from FIG. 2.

FIG. 4 is an exemplary embodiment of a communication network, illustrating the facilitation of voicemail services between the PSTN network 202, an IP network 204, and the wireless network 206 similar to the diagram from FIG. 2. More specifically, as illustrated in the nonlimiting example of FIG. 4, a user operating the communications device 102a may initiate a communication via the central office 412a via the PSTN 202 to the central office 412b for a communication directed toward a user at the communications device 102b. If a user at the communications device 102b is currently unavailable, a central office 412b may be configured to determine that the user is unavailable and forward the communication request via the central office 412d to a PSTN based voicemail server 418. The PSTN based voicemail server 418 may be configured to provide the caller with an option to leave a message for the user of the communications device 102b. After receiving a message, the PSTN based voicemail server 418 may be configured to send a message waiting indicator signal (MWI) signal, via the PSTN 202, to the communications device 102b, such that when a user returns to the communications device 102b, a message waiting indicator may be displayed. The message waiting indicator may include a light, light emitting diode (LED), liquid crystal display (LCD) screen output, a pulsating dial tone, and/or other indicators for conveying the received data.

As the communications device 102b is coupled to the PSTN 202 and the PSTN based voicemail server 418 is configured to operate in the PSTN 202, the message waiting indicator signal sent to the communications device 102b may be received without modification. Similarly, if users of the communications devices 104a and/or 106 desire to send a communication request to a user of the user communications device 102b who is currently unavailable, the PSTN voicemail server 418 may be configured to provide a message waiting indicator signal to the communications device 102b without modification. Upon receiving the message waiting indicator signal, the communications device 102b can display the message waiting indicator.

Similarly, if a caller initiates communication requests to a user on the communications device 104b which is configured to operate on the IP network 204 and the user of communications device 104b is currently unavailable, an IP based voicemail server 424 may be configured to receive a forwarded call from the communications device 104b via the IP network 204 and then provide the message services as described above. Additionally, the IP based voicemail server 424 may be configured to send a message waiting indicator signal via session initiation protocol (SIP) such that the user of communications device 104b may be provided with an indication that a message is currently being stored at the IP based voicemail server 424. As discussed above, the origination of the call is irrelevant to the communication of the message waiting indicator signal.

As an additional nonlimiting example, the user of the PSTN based communications device 102b utilizes the IP based voicemail server 424 and may receive a communication request from a user (via the PSTN based communications device 102a, via an IP based communications device 104, a wireless based communications device 106, and/or other communications devices). Upon receiving the voicemail from the caller, the IP based voicemail server 424 can send a SIP message waiting indicator signal to a terminal server 422. The terminal server 422 can be configured to receive the SIP message from the IP based voicemail server 424 and convert the received message waiting indicator signal into a simplified message disk interface (SMDI) message and/or signaling system number 7 protocol (SS7). The converted message waiting indicator signal can then be sent to the central office 412d at the PSTN 202, which may then be sent to the PSTN based communications device 102b, such that a user can identify that a message is waiting.

Additionally, in some configurations, a user of the IP based communications device 104b and/or Plain Old Telephone System (POTS) communications device 104a, 104c may utilize the PSTN based voicemail server 418. As discussed above, a caller sending a communication request to a user on the communications device 104a may send the communications request from the PSTN based communications device 102b via the central office 412b via the PSTN 202. The PSTN 202 may then facilitate communication of the communication request to the IP network 204, which may then send the message to a Digital Subscriber Line Access Module (DSLAM) 426. The DSLAM 426 may be configured to incorporate the PSTN based (e.g., POTS and/or other communications devices) into the IP network 204. Upon a determination by the PSTN 202 and/or the IP network 204 that a user is currently unavailable at the communications device 104a, a communication request can be forwarded to the PSTN based voicemail server 418, to which the user of 104a is currently subscribed. The PSTN based voicemail server 418 can be configured to receive the forwarded communication request and provide a user prompt for the caller to leave a message for the user of the communications device 104a.

The PSTN based voicemail server 418 can send a Simplified Message Desk Interface (SMDI) and/or other message waiting indicator signal to a converter 414. The converter 414 may be configured to receive the message waiting indicator and an address of the recipient of the message waiting indicator signal (e.g., a telephone number of the user device 104a). The converter 414 may also be configured to send the received address to a SIP locator 416. The SIP locator 416 may be configured to receive the address (which may include a telephone number, email address, Instant Messaging address, and/or other address) to determine a uniform resource identifier (URI) associated with the received address. The SIP locator 416 can then send the URI to the converter 414. The converter 414 can send the message waiting indicator signal via SS7, SIP and/or other IP based protocols to the IP network 204. The IP network 204 can send the message to the DSLAM 426, which from the received URI can determine an IP address of the communications device 104a. The message waiting indicator may then be received by the communications device 104a, which can indicate to the user that a message is currently waiting on the PSTN based voicemail server 418.

As an additional nonlimiting example, a user of the wireless network 206 such as a user of the communications device 106 may be configured to receive voicemails via the PSTN based voicemail server 418. As such, if a user receives a message at the PSTN based voicemail server 418, the PSTN voicemail server 418 may be configured to send an SMDI message waiting indicator signal (and/or other PSTN based message waiting indicator signal) to a wireless network converter 420. The wireless network converter 420 may be configured to receive the PSTN based message waiting indicator signal and send the message waiting indicator signal to the wireless network 206. The wireless network 206 may then send the converted message waiting indicator signal to the user device 106, such that the user can receive an indication that a message is waiting on the PSTN based voicemail server 418.

One should note that while the converter 414 (and/or the SIP locator 416) are depicted as providing services to one PSTN voicemail server 418 in FIG. 4, this is a nonlimiting example. More specifically, in at least one exemplary embodiment, the converter 414 (and/or the SIP locator 416) may be configured to provide services to a plurality of PSTN voicemail servers. While the plurality of PSTN voicemail servers may be associated with the same sub-network (see FIG. 3), this is not a requirement. More specifically, depending on the particular embodiment, the converter 414 (and/or the SIP locator 416) may be configured to provide services to one or more different PSTN voicemail servers associated with a plurality sub-networks. As such, depending on the particular configuration, the converter 414 (and/or the SIP locator 416) may be configured to communicate to the PSTN voicemail servers via one or more different protocols. Other exemplary embodiments may include an external database that could be used to look-up a mapping between the PSTN address of the called party to an IP based address. Such a configuration may include, for example, Telephone Number Mapping (ENUM) or Lightweight Directory Access Protocol (LDAP) type of database.

Figure 5:
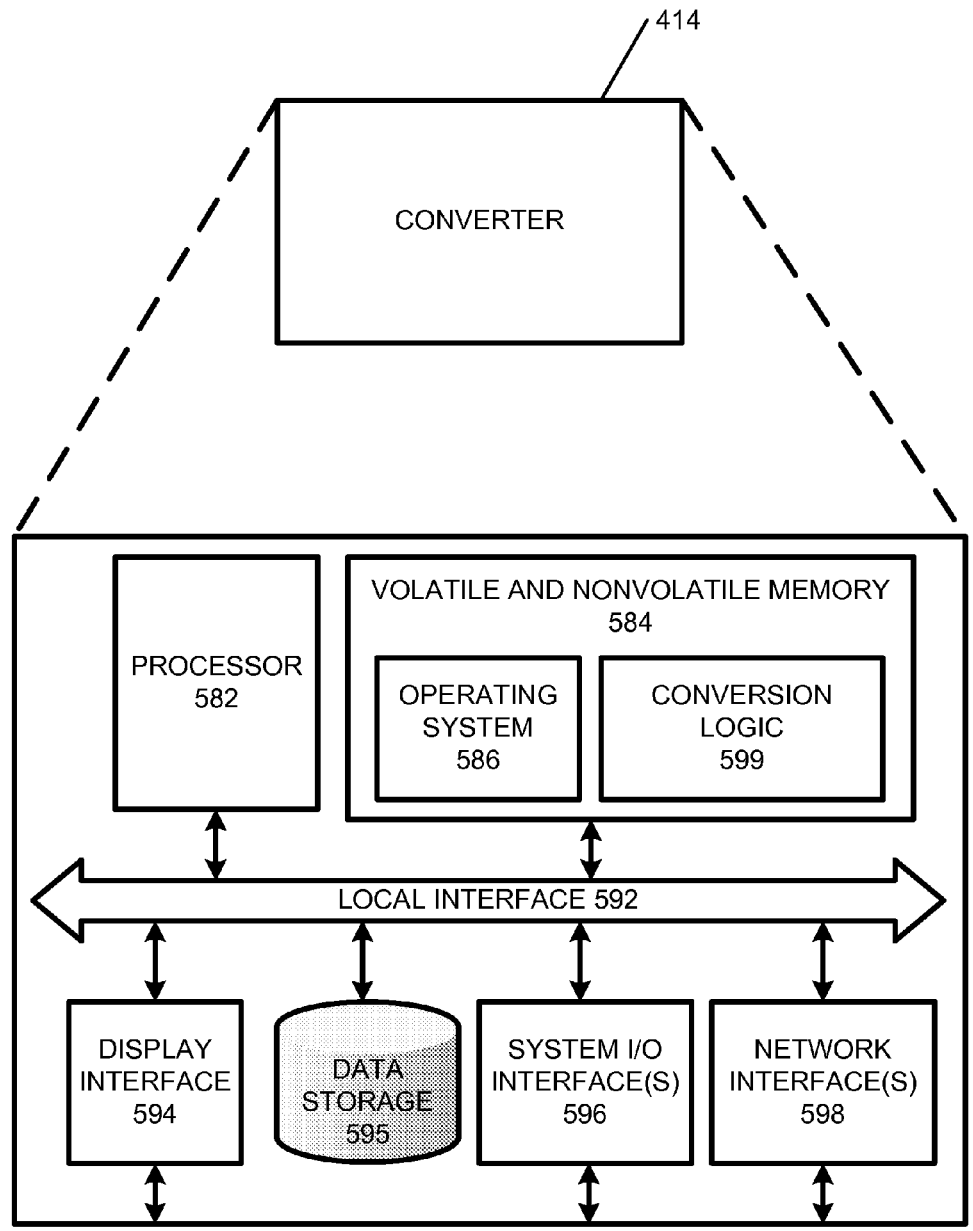
FIG. 5 is a block diagram illustrating an exemplary embodiment of a converter that may be configured to communicate via a communications network such as the network from FIG. 4.

FIG. 5 is a block diagram illustrating an exemplary embodiment of a converter that may be configured to communicate via a communications network such as the network from FIG. 4. Although a wire-line communications device is illustrated, this discussion can be applied to wireless devices, as well. Generally, in terms of hardware architecture, as shown in FIG. 5, the converter 414 includes a processor 582, volatile and nonvolatile memory 584, a display interface 594, data storage 595, one or more input and/or output (I/O) device interface(s) 596, and/or one or more network interfaces 598 that are communicatively coupled via a local interface 592. The local interface 592 can include, for example but not limited to, one or more buses or other wired or wireless connections. The local interface 592 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 582 may be a device for executing software, particularly software stored in volatile and nonvolatile memory 584. The processor 582 can include any custom made or commercially available processor, a central processing unit (CPU), an auxiliary processor among several processors associated with the communications device 106, a semiconductor based microprocessor (in the form of a microchip or chip set), a macroprocessor, and/or generally any device for executing software instructions.

The volatile and nonvolatile memory 584 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 584 may incorporate electronic, magnetic, optical, and/or other types of storage media. One should note that the volatile and nonvolatile memory 584 can have a distributed architecture (where various components are situated remote from one another), but can be accessed by the processor 582.

The software in volatile and nonvolatile memory 584 may include one or more separate programs, each of which includes an ordered listing of executable instructions for implementing logical functions. In the example of FIG. 5, the software in the volatile and nonvolatile memory 584 may include conversion logic 599, as well as operating system 586. The operating system 586 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 584, so as to operate properly in connection with the operating system 586.

The Input/Output devices that may be coupled to system I/O Interface(s) 596 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 598 for facilitating communication with one or more other devices. More specifically, the network interface 598 may include any component configured to facilitate a connection with another device. While in some embodiments, among others, the converter 414 can include the network interface 598 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include the network interface 598 for communicating via a wired connection. Such interfaces may be configured with Universal Serial Bus (USB) interfaces, serial ports, and/or other interfaces.

If the converter 414 includes a personal computer, workstation, or the like, the software in the volatile and nonvolatile memory 584 may further include a basic input output system (BIOS) (omitted for simplicity). The BIOS is a set of software routines that initialize and test hardware at startup, start the operating system 586, and support the transfer of data among the hardware devices. The BIOS is stored in ROM so that the BIOS can be executed when the communications device 106 is activated.

When the converter 414 is in operation, the processor 582 may be configured to execute software stored within the volatile and nonvolatile memory 584, to communicate data to and from the volatile and nonvolatile memory 584, and to generally control operations of the communications device 106 pursuant to the software. Software in memory, in whole or in part, may be read by the processor 582, perhaps buffered within the processor 582, and then executed.

One should note that while the description with respect to FIG. 5 includes the converter 414 as a single component, this is a nonlimiting example. More specifically, in at least one embodiment, the converter 414 can include a plurality of servers, personal computers, and/or other devices. Similarly, while the description of FIG. 5 describes the converter 414, this is also a nonlimiting example, as other components may also be included in this description, such as SIP locator and/or other components.

Additionally, while the conversion logic 599 is illustrated in FIG. 5 as a single software component, this is also a nonlimiting example. In at least one embodiment, the conversion logic 599 may include one or more components, embodied in software, hardware, and/or firmware. Additionally, while the conversion logic 599 is depicted as residing on a single computing device, as converter 414 may include one or more devices, the conversion logic 599 may include one or more components residing on one or more different devices.

The embodiments disclosed herein can be implemented in hardware, software, firmware, or a combination thereof. At least one embodiment disclosed herein is implemented in software and/or firmware that is stored in a memory and that is executed by a suitable instruction execution system. If implemented in hardware, as in an alternative embodiment, embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
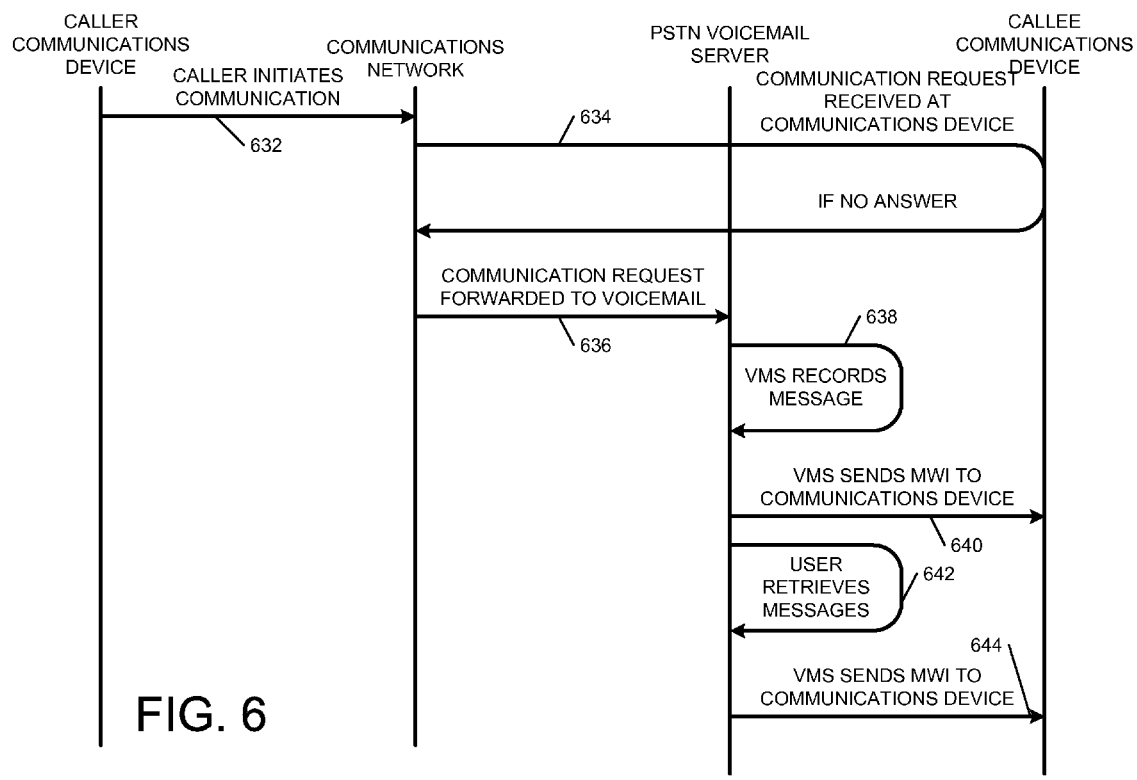
FIG. 6 is an exemplary embodiment of a sequence diagram illustrating a process for providing a message waiting indicator signal to a communications device such as the communications device in FIG. 4.

FIG. 6 is an exemplary embodiment of a sequence diagram illustrating a process for providing a message waiting indicator signal to a communications device such as a communications device in FIG. 4. As illustrated in this nonlimiting example, a caller can initiate a communication from caller communications device to a communications network such as the PSTN 202 (Arrow 632). The communications network can then send the communications request to a called party communications device such as the communications device 102*a*. After a predetermined amount of time (e.g., a predetermined number of rings and/or predetermined time limit), the communications network may determine that a user is currently unavailable at the communications device 102*a* (Arrow 634). The communications network can then send the communications request to a voicemail server, such as the PSTN based voicemail server 418 (Arrow 636). The PSTN voicemail server 418 can then record a message from the caller (Arrow 638). The voicemail server 418 can send a message waiting indicator signal to the communications device 102*a* (Arrow 640). At this point, a message waiting indicator will be activated for display at the user's communications device 102*a*.

If the user of the communications device 102*a* decides to access the voicemail server 418 (via the communications device 102*a* and/or other communications devices), the user may input a predetermined address for accessing his or her account on the PSTN based voicemail server 418. Upon accessing the user's account at the PSTN based voicemail server 418, the user can retrieve messages stored by the PSTN based voicemail server (Arrow 642). Upon retrieving his or her messages, the voicemail server 418 can send a message waiting indicator signal to the communications device 102*a* (Arrow 644) to provide indication to the users that no messages are currently waiting.

One should note that although the embodiments of FIG. 6 indicate that the message waiting indicator signal is sent only to a single communications device, this is a nonlimiting example. One should note that in at least one embodiment, a message waiting indicator signal can be sent to one or more communications devices at one or more addresses (e.g., the message waiting indicator signal can be sent to a plurality of different telephone numbers, IP addresses, etc.). Similarly, a message waiting indicator signal can be provided to other types of communications devices via e-mail accounts, instant messaging accounts, and/or other communications media.

Figure 7A:
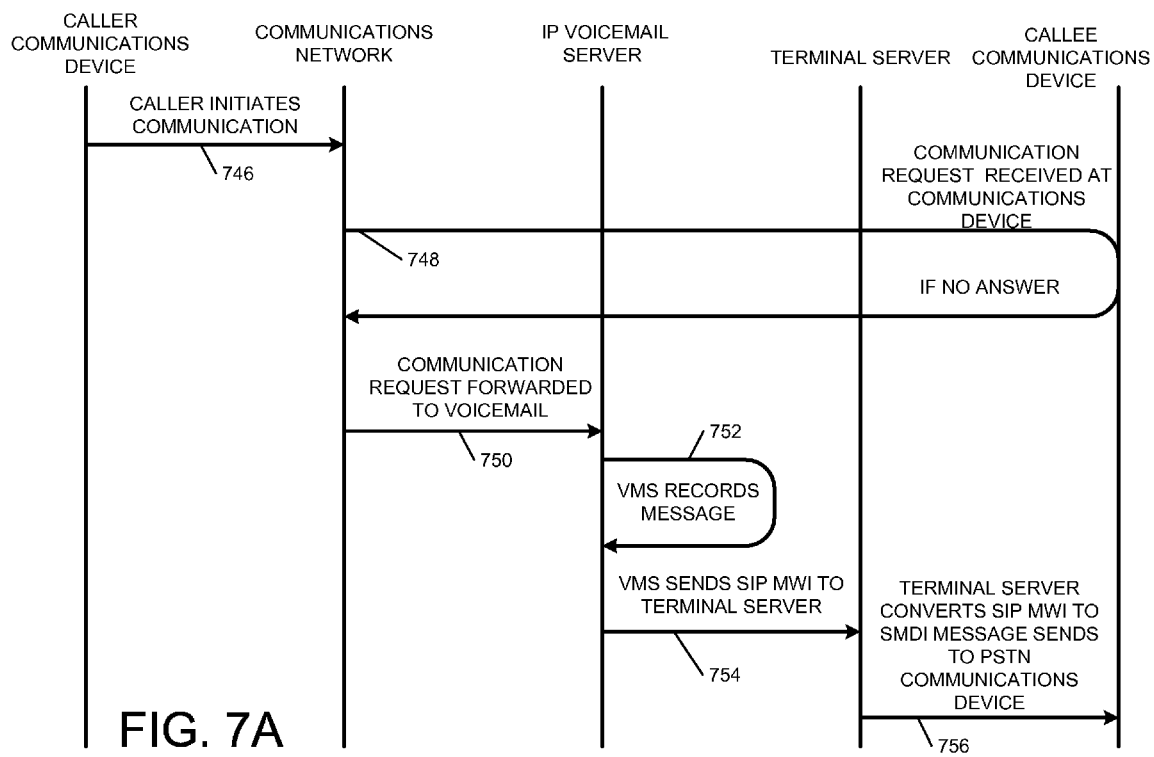
FIG. 7A is an exemplary embodiment of a sequence diagram for providing a message waiting indicator signal for an IP based voicemail server, similar to the sequence diagram from FIG. 6.

FIG. 7A is an exemplary embodiment of a sequence diagram for providing a message waiting indicator signal for an IP based voicemail server, similar to the sequence diagram from FIG. 6. As illustrated in the nonlimiting example of FIG. 7A, a caller initiates communication from caller communications device 102*d* (Arrow 746). The IP network 204 receives the communication request and sends the communication request to a called party communications device 104*a*. If the IP network 204 determines that the user is currently unavailable at the communications device 104*a*, the call is forwarded from the communications network 204 to the IP based voicemail server 424 (Arrow 750). The IP voicemail server 424 can then record a voicemail message (Arrow 752). The voicemail server 424 can then send a SIP message waiting indicator signal to a terminal server 422 (Arrow 754). The terminal server 422 can then convert the SIP message waiting indicator signal to an SMDI message (and/or other PSTN based protocol) and can send the SMDI message to the PSTN based communications device 102*a* (Arrow 756).

Figure 7B:
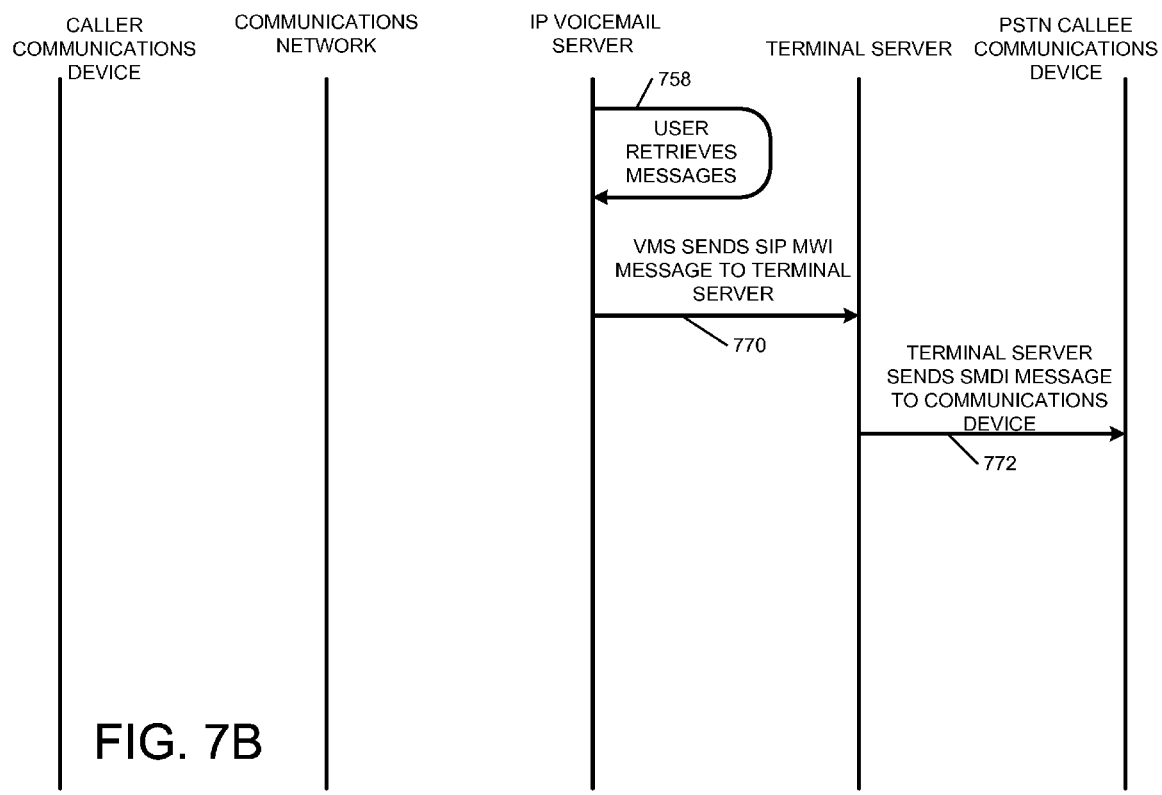
FIG. 7B is a continuation of the sequence diagram from FIG. 7A.

FIG. 7B is a continuation of the sequence diagram from FIG. 7A. As illustrated in the nonlimiting example of FIG. 7B, a user may then retrieve his or her messages at the IP voicemail server 424 (via the communications device 104*d* and/or other communications devices) as illustrated with Arrow 658. Upon providing messages to the user, the voicemail server 424 can send a SIP message waiting indicator signal to the terminal server 422 (Arrow 760) for indicating that there are currently no messages awaiting retrieval. The terminal server 422 can convert the SIP message into a PSTN based protocol (e.g., SMDI, SS7, etc.) and can send the converted message waiting indicator signal to the communications device 102*d* (Arrow 762).

Figure 8A:
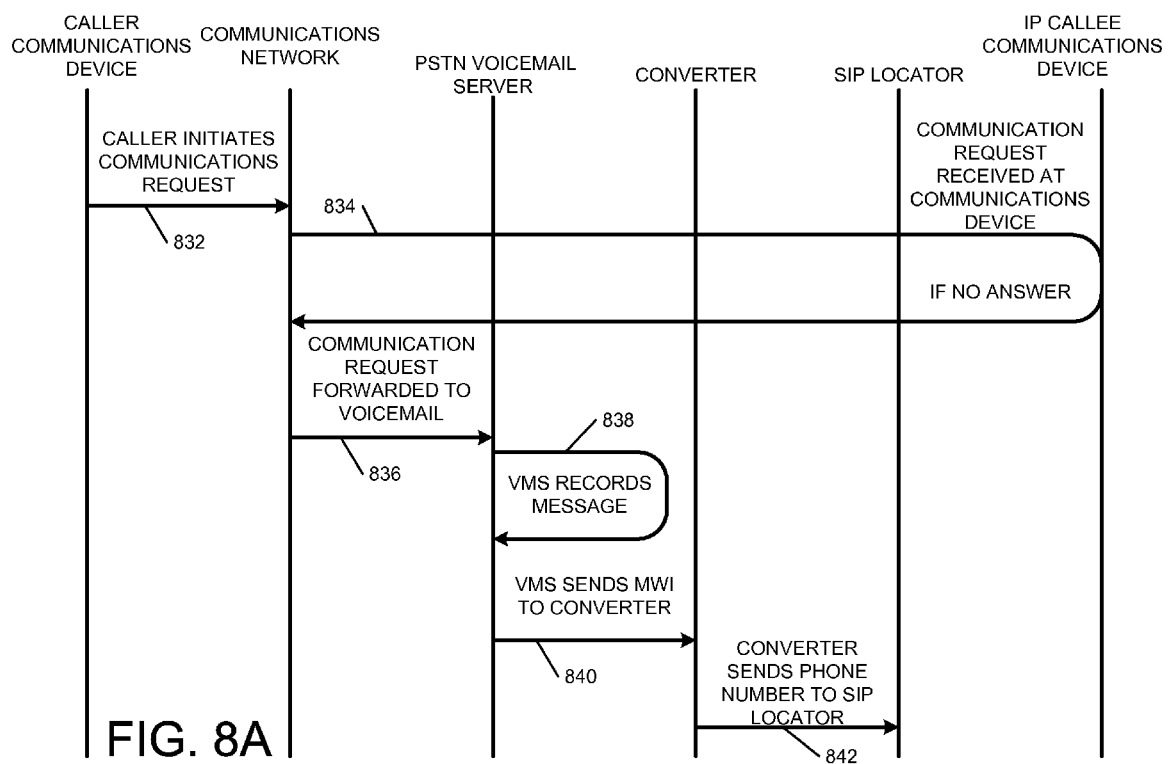
FIG. 8A is an exemplary embodiment of sequence diagram for providing the message waiting indicator signal to a PSTN communications device via an IP based communications device via a PSTN voicemail server, similar to the sequence diagram from FIGS. 7A and 7B.

FIG. 8A is an exemplary embodiment of sequence diagram for providing the message waiting indicator signal to an IP based communications device via a PSTN voicemail server, similar to the sequence diagram from FIGS. 7A and 7B. As illustrated in the nonlimiting example of FIG. 8A, a caller communications device initiates a communication request for an IP called party communications device via communications network such as the PSTN 202 (Arrow 832). The PSTN 202 can receive the communications request and send the communications request to an IP communications device such as the communications device 104*b*. If the PSTN 202 determines that a user is not currently available at the user device 104*b* (Arrow 834), the PSTN 202 can forward the communication request to the voicemail server 418 (Arrow 836). The PSTN voicemail server 418 then can prompt the caller to leave a voice message (Arrow 838). The PSTN based voicemail server 418 can then send a message waiting indicator signal (via SMDI and/or other protocols) to converter 414 (Arrow 840). The converter 414 can send an address associated with the called party device 104*b* (e.g., a phone number) to the SIP locator 416 (Arrow 842).

Figure 8B:
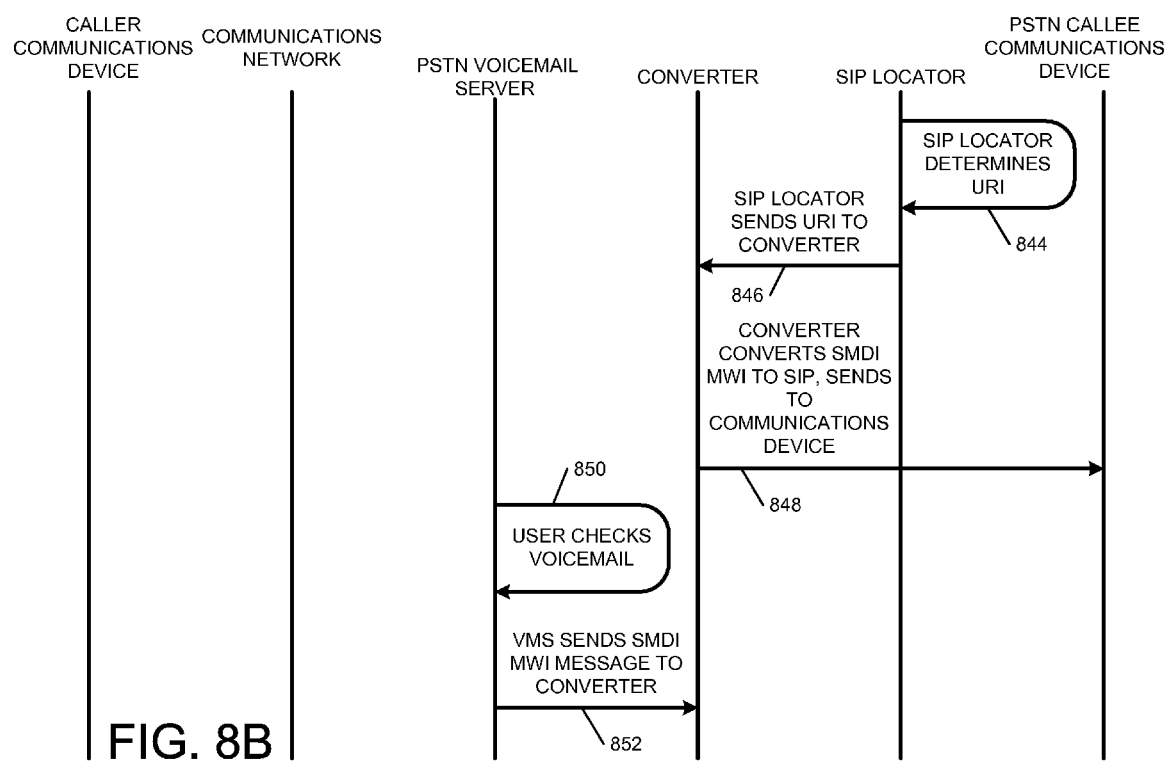
FIG. 8B is a continuation of the sequence diagram from FIG. 8A.

FIG. 8B is a continuation of the sequence diagram from FIG. 8A. As illustrated in the nonlimiting example of FIG. 8B, the SIP locator 416 can return a URI and/or other address associated with called party device 104*b* for which the message was left (Arrow 844). The SIP locator 416 can then send the address (e.g., URI, URL, IP address, and/or other identifier) to the converter 414 (Arrow 846). The controller 414 can then convert the received PSTN based waiting indicator signal to SIP and/or other IP based protocol. The converter 414 can then send the converted message waiting indicator signal to the communications device 104*b* via the IP network 204 (Arrow 848).

At this point, as indicated above, user of the communications device 104*b* may be alerted that a message is waiting via a message indicator on the communications device 104*b*. The user may access the awaiting messages at the PSTN based voicemail server 418 via the communications device 104*b* and/or other communications device (Arrow 850). The PSTN based voicemail server 418 can then send a PSTN based message waiting indicator signal (e.g., SMDI and/or other protocol) to the converter 414 (Arrow 852) to turn a message waiting indicator "off."

Figure 8C:
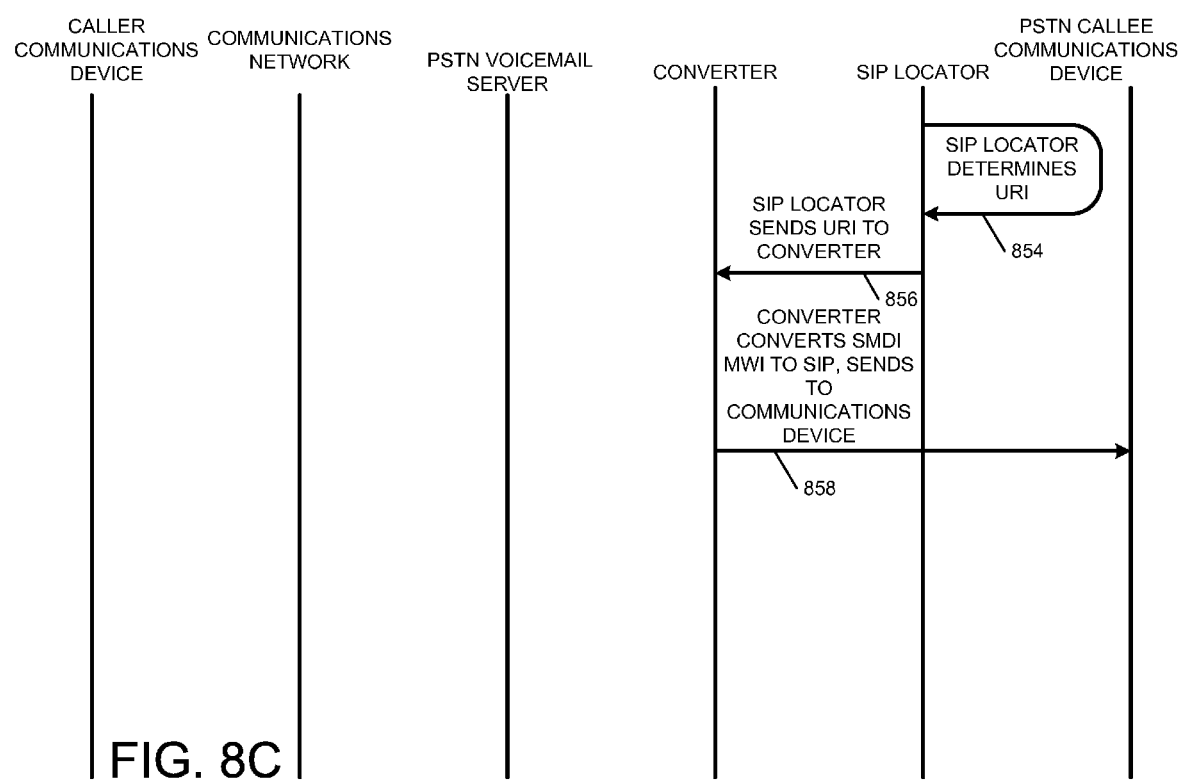
FIG. 8C is a continuation of the sequence diagram from FIG. 8B.

FIG. 8C is a continuation of the sequence diagram from FIG. 8B. As illustrated in the nonlimiting example of FIG. 8C, SIP locator 416 can determine an address (e.g., URI, URL, URN, IP address, etc.) as shown with Arrow 854. In the present example, a URI is determined. The SIP locator 416 can then send the determined identifier to the converter 414 (Arrow 856). The converter 414 may convert the received PSTN based (e.g., SMDI) message waiting indicator signal to a SIP and/or other protocol. The converter 416 can then send the converted message waiting indicator signal to communications device 104*b* (Arrow 858).

FIG. 9A is an exemplary embodiment of a sequence diagram for providing a message waiting indicator signal to a user of an IP based communications device via a wireless and IP network, similar to the sequence diagrams from FIGS. 8A, 8B, and 8C. As illustrated in the nonlimiting example of FIG. 9A, a caller can initiate a communications request (Arrow 932). The communications request can be received via the PSTN network 202. The PSTN network 202 can send the communication request to a dual mode WIFI handset such as communications device 106 from FIG. 4 (Arrow 934). If a determination is made that a user is currently unavailable at communications device 106, the PSTN network 202 can forward the communications request to the PSTN based voicemail server 418 (Arrow 936). The PSTN based voicemail server 418 can prompt the user to provide a voice message and record the received voice message (Arrow 938). The PSTN based voicemail server 418 can then send a message waiting indicator signal in a PSTN protocol such as SMDI to the converter 414 (Arrow 940). The converter 414 can send a phone number and/or other address to SIP locator 416 to determine a URI and/or other IP based indicator signal associated with the caller communications device (Arrow 942).

Figure 9B:
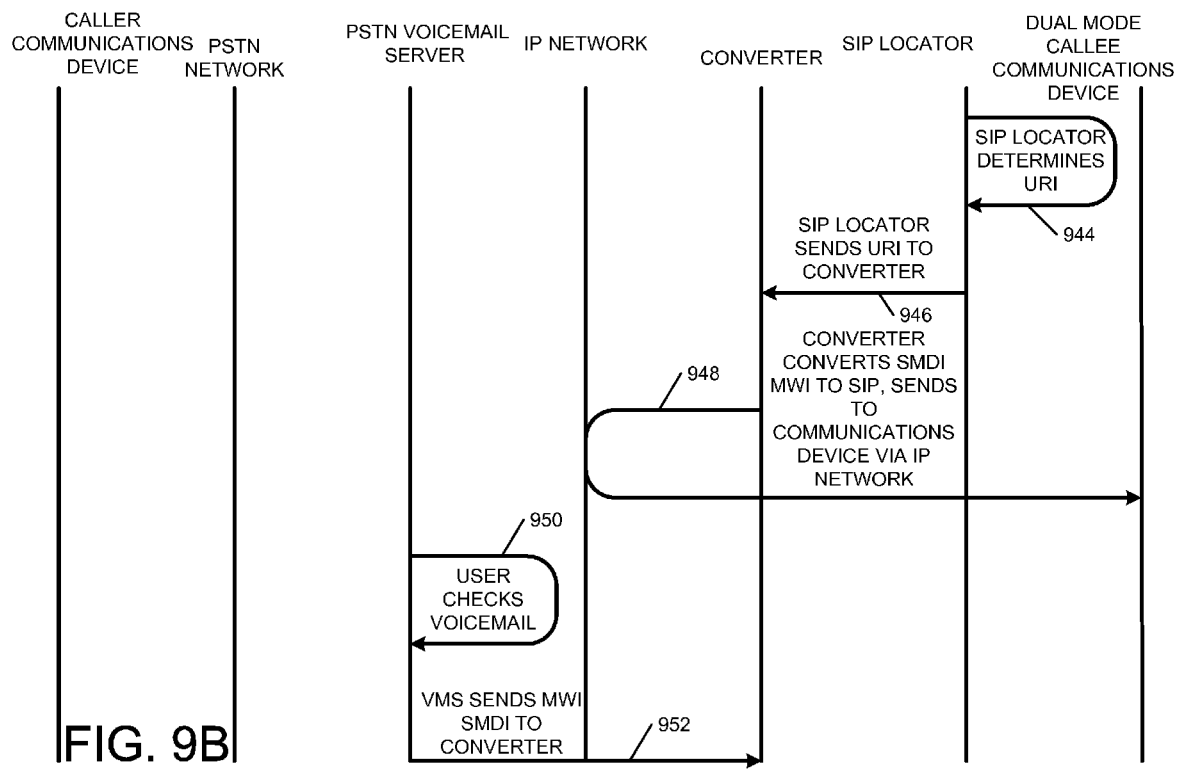
FIG. 9B is a continuation of the sequence diagram from FIG. 9A.

FIG. 9B is a continuation of the sequence diagram from FIG. 9A. As illustrated in the nonlimiting example of FIG. 9B, SIP locator may determine a URI and/or other IP based identifier of the caller device 106 (Arrow 944). The SIP locator 416 can then send the retrieved URI to the converter 414

(Arrow 946). The converter 414 may convert the received SMDI message waiting indicator signal to an IP based protocol such as SIP. The converter 414 may then send the converted message to the communications device 106 (Arrow 948). As previously indicated, a message waiting indicator signal may be provided to the communications device 106.

If a user determines that messages might be waiting at the PSTN based voicemail server 418, the user can check the voicemail from the communications device 106 and/or other communications devices (Arrow 950). Upon retrieving the user's message, the PSTN based voicemail server 418 can send a message waiting indicator signal via a PSTN based protocol such as SMDI to converter 414 (Arrow 952) to indicate that no messages are currently waiting.

Figure 9C:
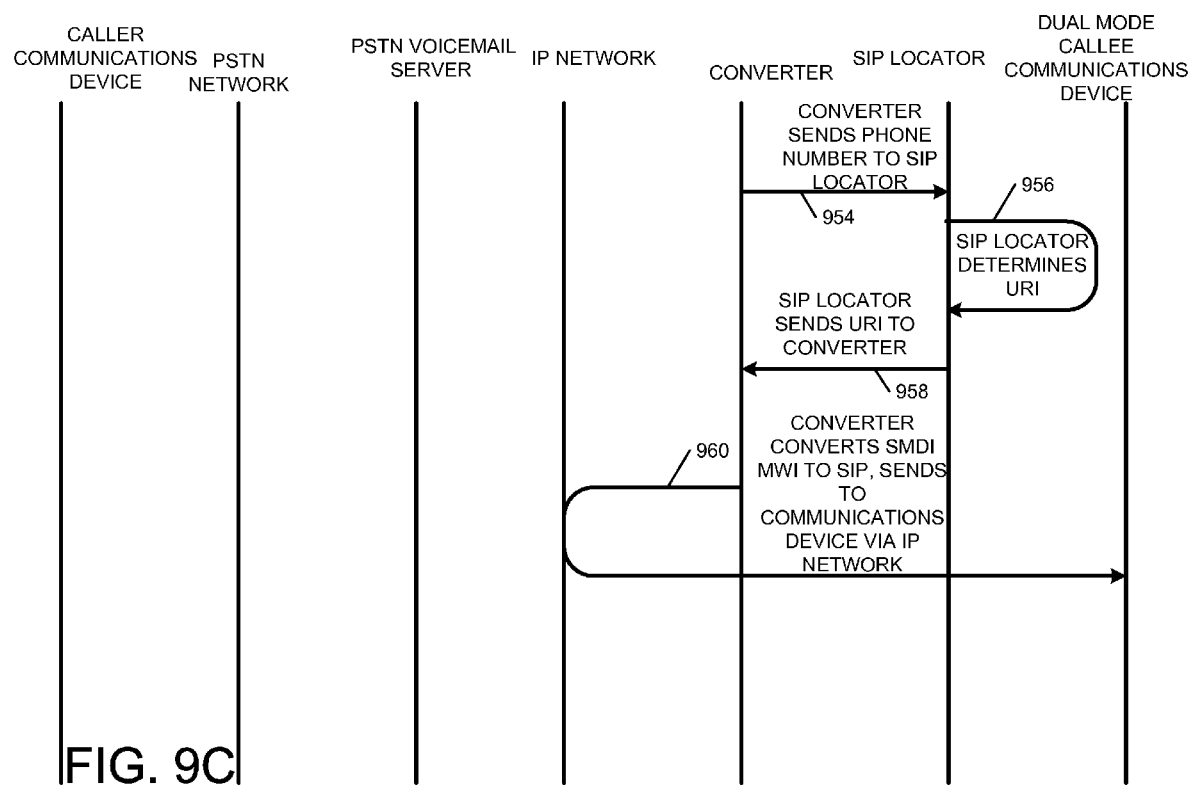
FIG. 9C is a continuation of the sequence diagram from FIGS. 9A and 9B.

FIG. 9C is a continuation of the sequence diagram from FIGS. 9A and 9B. As illustrated in the nonlimiting example of FIG. 9C, the converter 414 can send a phone number and/or other PSTN based identifier of the caller communications device to the SIP locator 416 (Arrow 954). The SIP locator 416 can then determine the IP based indicator such as a URI associated with the caller communications device 106 (Arrow 956). The SIP locator can then send the IP based identifier such as a URI to the converter 414 (Arrow 958). The converter 414 may then convert the received SMDI message waiting indicator signal to an IP based protocol such as SIP. The converter 414 can then send the converted message waiting indicator signal to the communications device 106 via IP network 204 (Arrow 960) to turn a message waiting indicator "off."

Figure 10A:
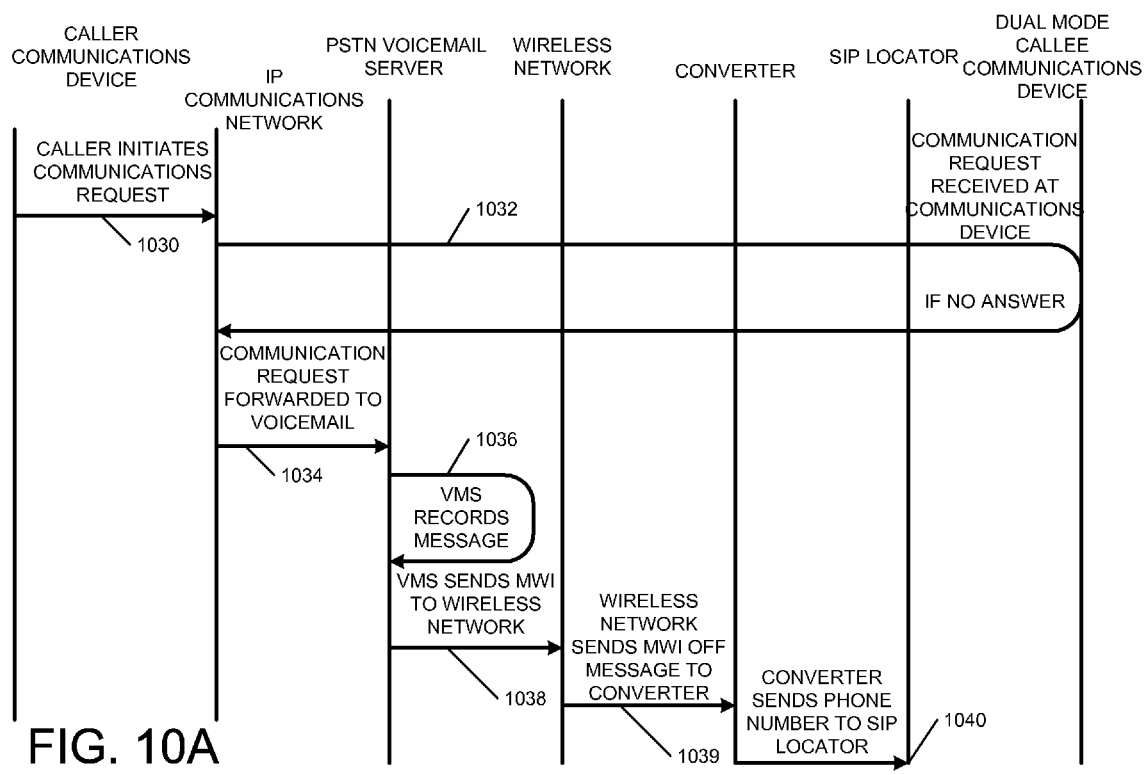
FIG. 10A is an exemplary embodiment of a sequence diagram for providing a message waiting indicator signal to a dual mode handset via a wireless network, similar to the sequence diagram from FIGS. 9A, 9B, and 9C.

FIG. 10A is an exemplary embodiment of a sequence diagram for providing a PSTN voicemail message waiting indicator signal to a dual mode handset that is Internet Protocol (IP) mode, similar to the sequence diagram from FIGS. 9A, 9B, and 9C. As illustrated in the nonlimiting example of FIG. 10A, a caller may initiate communications request for a called party on a dual mode handset such as the communications device 106 (Arrow 1030). The communications request can be received by the IP communications network 204 which may then send the received communication request to the dual mode called party communications device 106 (Arrow 1032). If a determination is made that the called party is currently unavailable at the communications device 106, the IP communications network 204 can forward the communication request to the PSTN based voicemail server 418 (Arrow 1034).

The PSTN based voicemail server 418 can receive and record a message from the caller (Arrow 1036). The PSTN based voicemail server can send a message waiting indicator signal via an SS7 based protocol to the wireless network 206 (Arrow 1038) to the Dual Mode Handset device 106 (called party device). The wireless network determines whether the Dual Mode handset is in IP mode, and if so, the wireless network sends a wireless MWI message to the converter (Arrow 1039). The converter 414 can receive the message waiting indicator signal from the wireless network 206. The converter 414 sends the received identifier to SIP locator 416 (Arrow 1040). One should note that while the above description describes an exemplary embodiment where the wireless network 206 determines a dual handset mode, this is a nonlimiting example. More specifically, in at least one exemplary embodiment, the wireless network 206 may be configured to send a message waiting indicator to the wireless device 106 and converter 414, simultaneously.

Figure 10B:
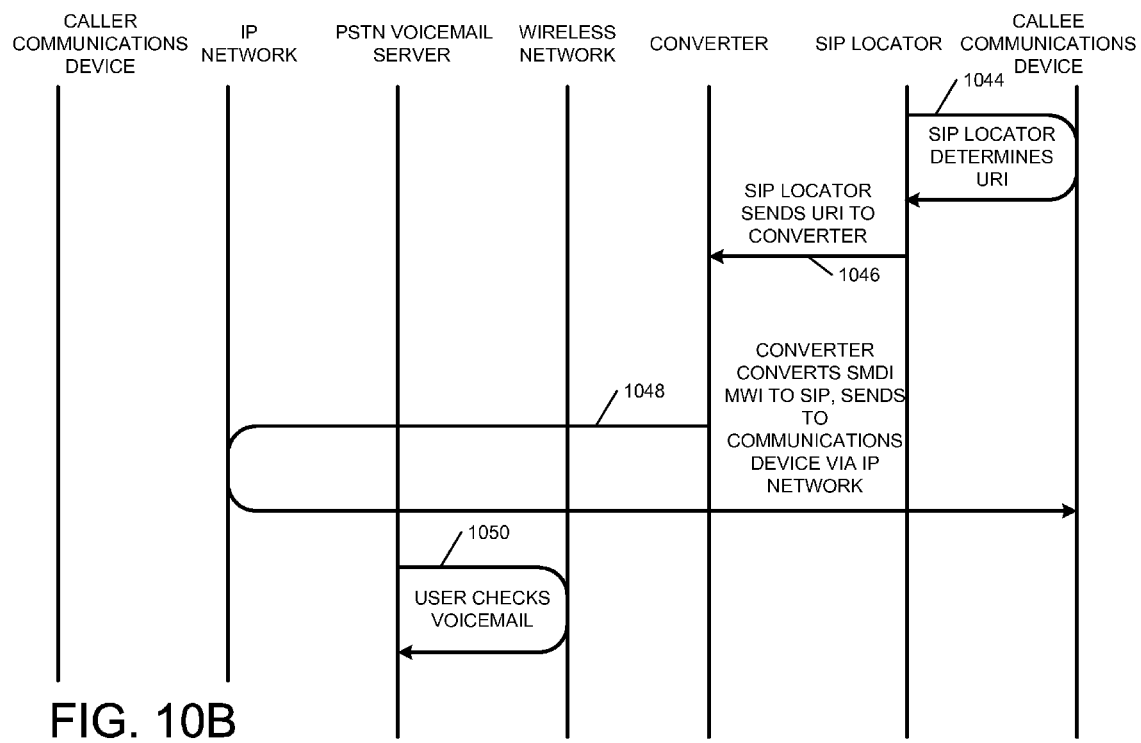
FIG. 10B is a continuation of the sequence diagram from FIG. 10A.

FIG. 10B is a continuation of the sequence diagram from FIG. 10A. As illustrated in the nonlimiting example of FIG. 10B, the SIP locator 416 determines an IP based identifier associated with the called party communications device such as a URI (Arrow 1044). The SIP locator 416 can then send the determined IP based identifier to the converter 414 (Arrow 1046). The converter 414 can then convert the message waiting indicator signal to an IP based protocol such as SIP. The converter can then send the converted message waiting indicator signal to the communications device via the IP network 204 (Arrow 1048). At this point, a message waiting indicator signal may be provided to a user of the communications device 106. The user may then check for voice messages at the PSTN based voicemail server 418 via a communications device such as the communications device 106, the communications device 104, and/or the communications device 102 (Arrow 1050).

Figure 10C:
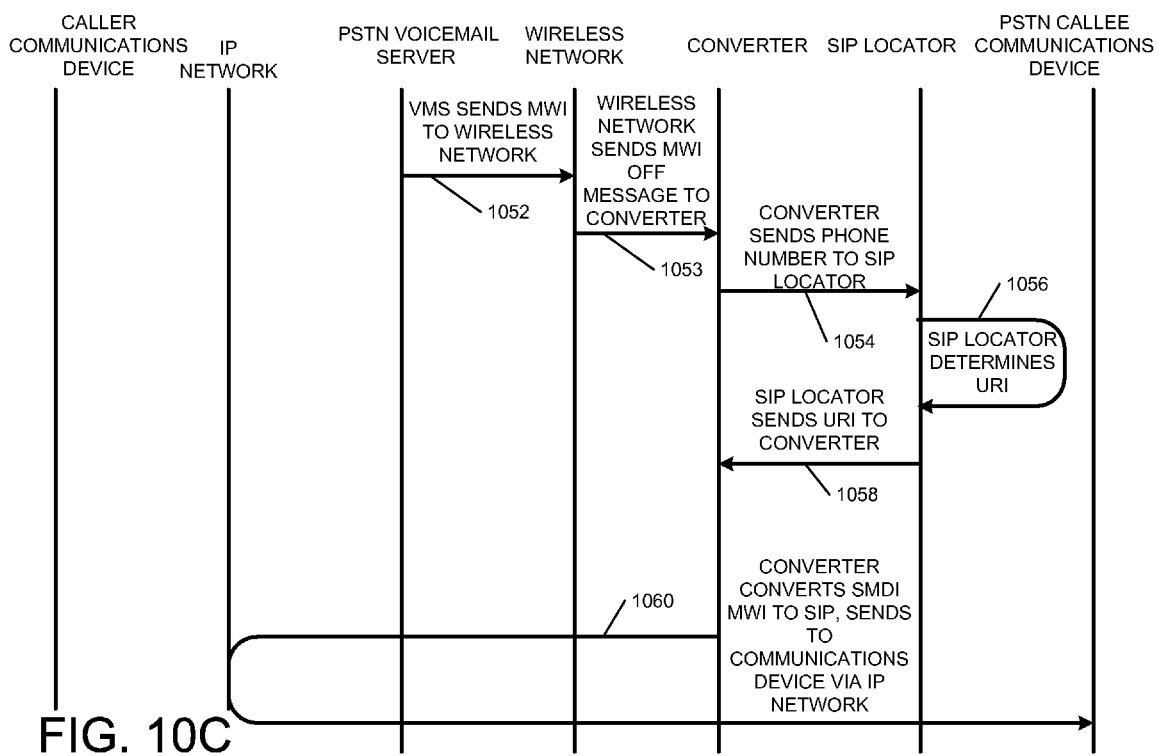
FIG. 10C is a continuation of the sequence diagram from FIGS. 10A and 10B.

FIG. 10C is a continuation of the sequence diagram from FIGS. 10A and 10B. As illustrated in the nonlimiting example of FIG. 10C, the PSTN based voicemail server 418 can then send a message waiting indicator to turn a message waiting indicator "off" (Arrow 1052). The wireless network may be configured to determine that the Dual Mode Handset is in an IP mode, so the wireless network can send a wireless MWI OFF message to converter 414 (Arrow 1053). The converter 414 can send the message waiting indicator signal and associated caller device identifiers (e.g., phone number) to the SIP locator 416 (Arrow 1054). The SIP locator 416 can then determine an IP based identifier associated with the caller communications device 106 (Arrow 1056). The SIP locator can then send and receive the determined identifier to the converter 414 (Arrow 1058). The converter 414 can then convert the received message waiting indicator signal to a SIP and/or other IP based protocol. The converter 414 can then send the converted message waiting indicator signal to the communications device 106 via the IP network 204 (Arrow 1060).

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for providing voicemail conversion, comprising:
receiving a message waiting indicator signal in a first protocol, the message waiting indicator signal being received from a Public Switched Telephone Network (PSTN) based voicemail server, the message waiting indicator signal being configured to indicate that a message for a called party has been received by the Public Switched Telephone Network based voicemail server;
receiving a Public Switched Telephone Network based identifier for an Internet Protocol (IP) based communications device associated with the called party; and
converting the received message waiting indicator signal from the first protocol to a second protocol, the second protocol being configured for communication to the Internet Protocol based communications device,
wherein the message waiting indicator is received and converted in response to a determination that a dual mode handset associated with the called party is currently set in an Internet Protocol mode.

2. The method of claim 1, further comprising sending the converted message waiting indicator signal to the Internet Protocol based communications device.

3. The method of claim 1, wherein the message waiting indicator signal is configured to indicate that a message is currently awaiting retrieval.

4. The method of claim 1, wherein the message waiting indicator signal is configured to indicate that no message is currently awaiting retrieval.

5. The method of claim 1, further comprising facilitating a determination of an Internet Protocol based identifier associated with the Internet Protocol based communications device.

6. The method of claim 5, wherein the Internet Protocol based identifier includes at least one of the following: a Uniform Resource Identifier (URI) and an Internet Protocol address.

7. The method of claim 1, wherein the second protocol being configured for communication to the Internet Protocol based communications device includes a Session Initiation Protocol (SIP).

8. A system for providing voicemail conversion, comprising:
an indicator receiving component configured to receive a message waiting indicator signal in a first protocol, the message waiting indicator signal being received from a voicemail server, the message waiting indicator signal being configured to indicate that a message for a called party has been received by the voicemail server, the voicemail server being configured to operate according to the first protocol;
an identifier receiving component configured to receive an identifier in the first protocol for a communications device associated with the called party, the communications device associated with the called party being configured to operate according to a second protocol; and
a converting component configured to convert the received message waiting indicator signal from the first protocol to the second protocol,
wherein the message waiting indicator is received and converted in response to a determination that a dual mode handset associated with the called party is currently set in an Internet Protocol mode.

9. The system of claim 8, further comprising a sending component configured to send the converted message waiting indicator signal to the communications device associated with the called party.

10. The system of claim 8, wherein the first protocol includes an Internet Protocol and the second protocol includes a Public Switched Telephone Network based protocol.

11. The system of claim 8, wherein the first protocol includes a Public Switched Telephone Network based protocol and the second protocol includes an Internet Protocol.

12. The system of claim 8, further comprising a determination component configured to facilitate a determination of a second protocol based identifier associated with the second protocol based communications device.

13. The system of claim 12, wherein the second protocol based identifier includes at least one of the following: a Uniform Resource Identifier (URI) and an Internet Protocol address.

14. The system of claim 8, wherein the second protocol being configured for communication to the second protocol based communications device includes a Session Initiation Protocol (SIP).

15. A non-transitory computer readable medium for providing voicemail conversion, comprising:
indicator receiving logic configured to receive a message waiting indicator signal in a first protocol, the message waiting indicator signal being received from a Public Switched Telephone Network (PSTN) based voicemail server, the message waiting indicator signal being configured to indicate that a message for a called party has been received by the Public Switched Telephone Network based voicemail server;
identifier receiving logic configured to receive a Public Switched Telephone Network based identifier for an Internet Protocol (IP) based communications device associated with the called party; and
converting logic configured to convert the received message waiting indicator signal from the first protocol to a second protocol, the second protocol being configured for communication to the Internet Protocol based communications device, wherein the message waiting indicator signal is received and converted in response to a determination that a dual mode handset associated with the called party is currently set in an Internet Protocol mode.

16. The non-transitory computer readable medium of claim 15, further comprising sending logic configured to send the converted message waiting indicator signal to the Internet Protocol based communications device.

17. The non-transitory computer readable medium of claim 15, wherein the message waiting indicator signal is configured to indicate that a message is currently awaiting retrieval.

18. The non-transitory computer readable medium of claim 15, wherein the message waiting indicator signal is configured to indicate that no message is currently awaiting retrieval.

19. The non-transitory computer readable medium of claim 15, further comprising determination logic configured to facilitate a determination of an Internet Protocol based identifier associated with the Internet Protocol based communications device.

* * * * *